(No Model.)

H. M. HOADLEY.
HORSESHOE NAIL CUTTER AND CLINCHER.

No. 546,665. Patented Sept. 24, 1895.

Witnesses
W. J. Norton
T. H. Browne

Inventor,
Henry M. Hoadley,
By Cyrus Bussey,
his Attorney.

UNITED STATES PATENT OFFICE.

HENRY M. HOADLEY, OF VAN WERT, IOWA.

HORSESHOE-NAIL CUTTER AND CLINCHER.

SPECIFICATION forming part of Letters Patent No. 546,665, dated September 24, 1895.

Application filed January 2, 1895. Serial No. 533,587. (No model.)

*To all whom it may concern:*

Be it known that I, HENRY M. HOADLEY, a citizen of the United States, residing at Van Wert, in the county of Decatur and State of Iowa, have invented certain new and useful Improvements in Farriers' Implements; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to implements employed in the operations of shoeing animals, and has for its object the production of an improved combined clipper and clincher, possessing advantages in point of efficiency and durability, in that by its use the point of a nail is clipped to the proper length for clinching, and the latter operation is effected in a positive and perfect manner, and by reason of the adjustability of certain of the parts the life and usefulness of the implement are considerably prolonged.

The nature of my invention will appear from a reading of the following description, when taken in connection with the accompanying drawings, which form a part of this specification, and in which—

Figure 1:
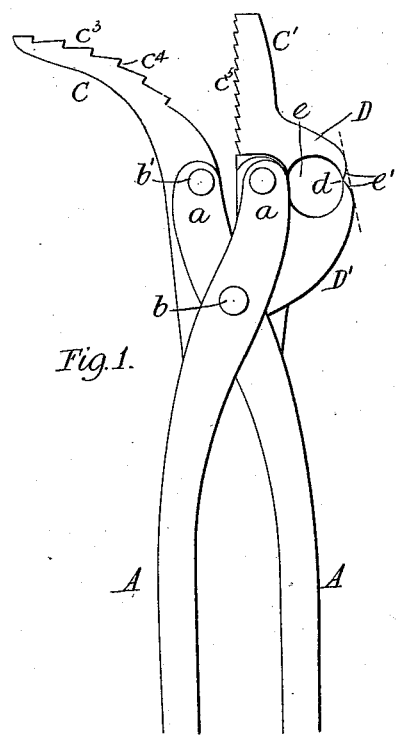
Figure 2:
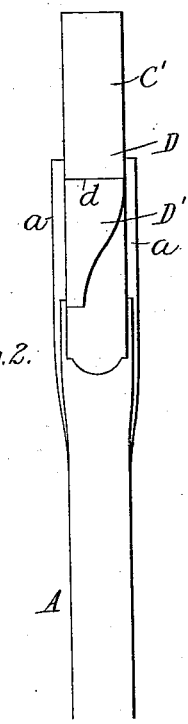
Figure 4:
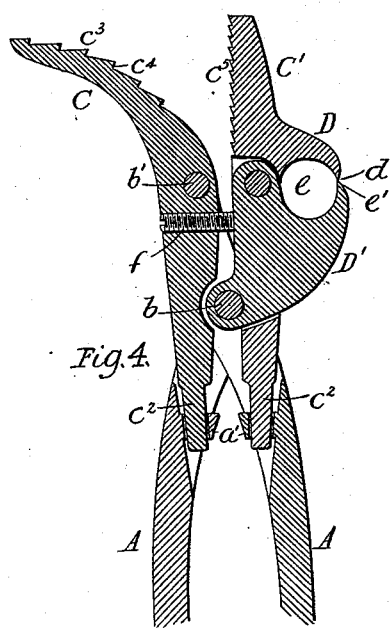
Figure 3:
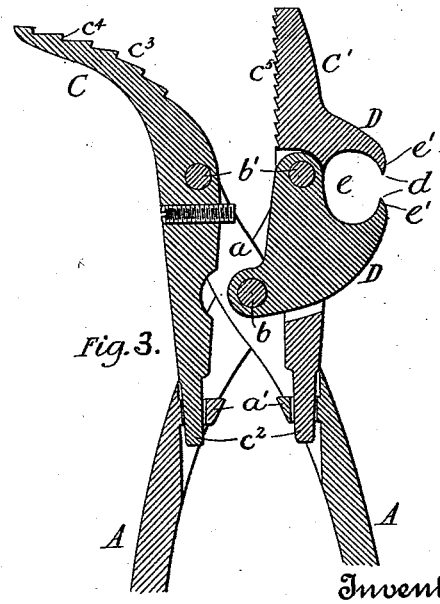

Figure 1 is a side elevation of my improved implement. Fig. 2 is a side view of the same, looking toward the left hand. Fig. 3 is a vertical sectional view with the implement open for use; and Fig. 4 is a similar view, but showing the implement in a closed condition.

By reference to the said drawings it will be seen that I combine two devices—namely, a clipper and a clincher—in one implement, both of which are operated by the same means, thereby not only facilitating the operations of shoeing, but reducing the expense incidental to the employment of two separate implements and the liability of any of them becoming lost or misplaced.

The handles of the implement are shown at A A, and the upper end $a$ of each is bifurcated and offset to permit of the crossing and pivotal connection of said ends by a pivot-pin $b$. The ends $a$ $a$ are extended beyond this pivotal point for connection with the jaws of the implement, and $a'$ $a'$ are guide-blocks arranged between the bifurcations of the ends $a$ and below the pivotal point for a second connection with said jaws.

In my improved implement both of the clinching-jaws are relatively movable in parallel lines, which increases the efficiency and facilitates the operation, and this parallel movement is obtained by the following construction: The jaws, which are designated at C C', are arranged between the bifurcated ends $a$ and each of said jaws is pivotally connected by means of a pin $b'$ with the extremity of one of the said ends, and its lower end $c^2$ is reduced and is slidable in the guide-block $a'$ in the opposite bifurcated end. In other words, each jaw has a pivotal connection with one handle and a slidable connection with the other handle, and the ends $a$ being crossed the opening or closing of the handles will impart to said jaws movements relatively parallel.

The jaw C beyond its pin $b'$ is outwardly curved and its inner side is provided with a series of ratchet-shaped clinching-teeth $c^3$, the faces $c^4$ of which teeth in practice engage the projecting end of the nail. The other jaw C' is extended beyond its pin $b'$ and the inner side thereof is provided with teeth or serrations $c^5$, which in practice engage the under side of the shoe and insure a firm hold during the operation of the clinching-jaw C.

The jaw C' is provided on its outer side with an integral extension, which forms the fixed jaw D of the clipper, and at one side this jaw C' is cut away to accommodate the movable jaw D' of said clipper, these jaws D D' operating in practice to reduce the projecting end of the nail to the proper length for clinching. The movable jaw lies within the cut-away portion of the jaw C' flush with the surface of the latter, and hence is within the bifurcation of the ends of the handles. This movable jaw is pivoted at its upper end to the pin $b'$ of the jaw C', and at its lower end to the pin $b$, which connects the handle ends. By reason of this arrangement the jaw D' is moved to and from the fixed jaw by the closing and opening of the handles, as plainly shown in Figs. 3 and 4. The cutting-edges $d$ of the clipper-jaws are prevented from contact when closed, as will be explained, and the jaw D' is extended beyond the jaw C' to correspond with the cutting-edge of the fixed jaw. (See Fig. 1.) These cutting-edges are formed by cutting away the jaws at e and by beveling the outer side of the jaws at e'. The cut-away portion e is of sufficient size to permit of the insertion, if desired, of a sharpening device and also to allow the end of the nail to fall freely when severed. The beveling of the outer sides of the jaw not only brings the ends of the jaws to sharp cutting-edges, but brings said edges inside of the extreme outer or hoof side of the jaws, thereby providing sufficient clearance to leave the proper length of nail exposed for clinching. The extreme outer side of said jaws is indicated by a dotted line in Fig. 1, and the distance between said line and the cutting-edges shows the amount of clearance, or, in other words, the length of nail exposed after severing.

As before stated, the cutting-edges of the clipping-jaws do not contact when closed, and in order to insure their relation at all times I provide a stop in the nature of a set-screw $f$, which is passed through the jaw C and projects beyond a sufficient distance to limit the movement of the handles, the end of the screw forming a stop, against which the jaw C' abuts. By the employment of this set-screw, which is readily turned by an ordinary screwdriver, the cutting-edges of the clipping-jaws may be adjusted regardless of repeated sharpenings to close without contact with each other, the result being the non-liability of destroying the edges by reason of contact and undue pressure on the handles and the extension of the period of usefulness of the instrument, it being understood that as said edges become reduced the handles are permitted to come closer together by moving the set-screw.

The cutting-edges of the clipper are parallel, and by reason of the peculiar mounting of the clinching-jaws the latter are double-acting, inasmuch as they move relatively parallel and in straight lines, driving the clinched portion of the nail directly toward its head. The power, moreover, is exerted in straight lines, as distinguished from the ordinary clincher, in which the movement of the jaws is in the arc of a circle. The teeth or serrations in the engaging sides of the clinching-jaws insure a positive hold and purchase and preclude slipping.

The implement as a whole is comparatively simple in construction, and hence may be cheaply produced. It can be made light in weight, but with great power, and can be easily handled and operated. The provision for adjustment, moreover, renders the implement very durable and thereby enhances its value.

I claim as my invention—

1. In a farrier's implement, the combination with two handles the upper ends of which are crossed and connected together by a pivot pin, and provided below said pivot pin with perforated guide blocks, of two clinching jaws one of which carries a fixed clipping jaw and both of which clinching jaws are pivotally secured to the upper ends of the handles and have their lower ends reduced and slidably movable in said guide blocks, a movable clipping jaw pivoted at its upper end with the clinching jaw carrying the fixed clipping jaw, and at its lower end to the pivot pin, and a set screw passed through one of the clinching jaws above said pivot pin to adjust the movement of both jaws, substantially as and for the purpose set forth.

2. In a farrier's implement, the combination with two handles the upper ends of which are crossed and connected together by a pivot pin, and provided below said pivot pin with perforated guide blocks, of two clinching jaws one of which carries a fixed clipping jaw and both of which clinching jaws are pivotally secured to the upper ends of the handles and have their lower ends reduced and slidably movable in said guide blocks, a movable clipping jaw pivoted at its upper end with the clinching jaw carrying the fixed clipping jaw, and at its lower end to the pivot pin, said clipping jaws having cutting edges which, when closed, are within the extreme outer side of said jaws, and a set screw passed through one of the clinching jaws above said pivot pin to adjust the movement of both jaws, all substantially as and for the purposes set forth.

In testimony whereof I affix my signature in presence of two witnesses.

HENRY M. HOADLEY.

Witnesses:
D. E. TUTTLE,
T. M. CRAFT.